US012736769B2

(12) United States Patent
Ho et al.

(10) Patent No.: US 12,736,769 B2
(45) Date of Patent: Sep. 15, 2026

(54) LENS ASSEMBLY AND PROCESSING METHOD OF LENS ASSEMBLY

(71) Applicants: Asphetek Solution (Chengdu) Ltd., Chengdu (CN); Asphetek Solution Inc., Hsinchu (TW)

(72) Inventors: Chung-Chiao Ho, Hsinchu (TW); Yu-Pi Kuo, Hsinchu (TW); Chung-Wu Liu, Hsinchu (TW); Cheng-Hong Jiang, Hsinchu (TW)

(73) Assignees: Asphetek Solution (Chengdu) Ltd., Chengdu (CN); Asphetek Solution Inc., Hsinchu (TW)

( * ) Notice: Subject to any disclaimer, the term of this patent is extended or adjusted under 35 U.S.C. 154(b) by 266 days.

(21) Appl. No.: 18/777,599

(22) Filed: Jul. 19, 2024

(65) Prior Publication Data

US 2025/0060555 A1 Feb. 20, 2025

(30) Foreign Application Priority Data

Aug. 19, 2023 (CN) ........................ 202311048273.9

(51) Int. Cl.
*G02B 7/02* (2021.01)
*G02B 27/28* (2006.01)

(52) U.S. Cl.
CPC ............ *G02B 7/021* (2013.01); *G02B 27/28* (2013.01)

(58) Field of Classification Search
CPC .......... G02B 7/02; G02B 7/021; G02B 7/006; G02B 27/28; G02B 27/286
USPC .... 359/371, 483.01, 485.03, 487.05, 489.18, 359/499.2
See application file for complete search history.

(56) References Cited

U.S. PATENT DOCUMENTS

2006/0204204 A1* 9/2006 Zenzinger ............. G02B 27/28 385/147
2007/0199645 A1* 8/2007 Yanai .................... G02B 27/28 156/99
2009/0174954 A1* 7/2009 Hara ...................... G02B 7/021 359/819

(Continued)

FOREIGN PATENT DOCUMENTS

CN 101029948 A 9/2007
CN 203870342 U 10/2014

(Continued)

*Primary Examiner* — Bumsuk Won
*Assistant Examiner* — Seth D Moser
(74) *Attorney, Agent, or Firm* — ScienBiziP, P.C.

(57) ABSTRACT

A lens assembly is provided, comprising a first lens, a first polarizing film, a second lens and a second polarizing film. The first lens provides a first surface, the first surface providing a plurality of first positioning parts. The first polarizing film is arranged on the first surface, a plurality of first position holes is defined on the first polarizing film. The second lens is arranged on one side of the first polarizing film away from the first lens, the second lens provides a second surface and a third surface, the second surface defines a plurality of first position grooves, the plurality of first position grooves matches with the plurality of first positioning parts, and the third surface provides a plurality of second positioning parts. The second polarizing film is arranged on the third surface, the second polarizing film defines a plurality of second position holes.

18 Claims, 5 Drawing Sheets

(56) References Cited

U.S. PATENT DOCUMENTS

| | | | | |
|---|---|---|---|---|
| 2009/0195766 | A1* | 8/2009 | Dieckmann | G02B 27/281 355/71 |
| 2010/0157428 | A1* | 6/2010 | Wu | G02B 3/0031 156/107 |
| 2011/0032475 | A1* | 2/2011 | Watanabe | B29D 11/00923 351/159.56 |
| 2021/0263328 | A1* | 8/2021 | Nakamura | G03B 21/10 |
| 2021/0318204 | A1* | 10/2021 | Sonzogni | G01M 11/0221 |

FOREIGN PATENT DOCUMENTS

| | | | |
|---|---|---|---|
| CN | 111948773 | A | 11/2020 |
| EP | 3502768 | A1 | 6/2019 |
| TW | 201125719 | A1 | 8/2011 |
| TW | I461742 | B | 11/2014 |
| TW | 201936829 | A | 9/2019 |
| TW | 202321800 | A | 6/2023 |
| TW | I809974 | B | 7/2023 |

* cited by examiner

LENS ASSEMBLY AND PROCESSING METHOD OF LENS ASSEMBLY

FIELD

The present disclosure relates to field of optical device technology, particularly to a lens assembly and a processing method of a lens assembly.

BACKGROUND

Existing polarizing lenses include stacked lenses and polarizing films. Each polarizing lens has a polarizing axis. An angel among the polarizing axes of multiple stacked polarizing lenses is set according to specific design. Processing of the polarizing lens and the angle are carried out in a dark room, aided by a sensor. The polarizing lenses needs to be rotated to detect the angle. Existing methods of processing of the polarizing lens requires a high detection environment, a high sensor accuracy.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

Figure 1:
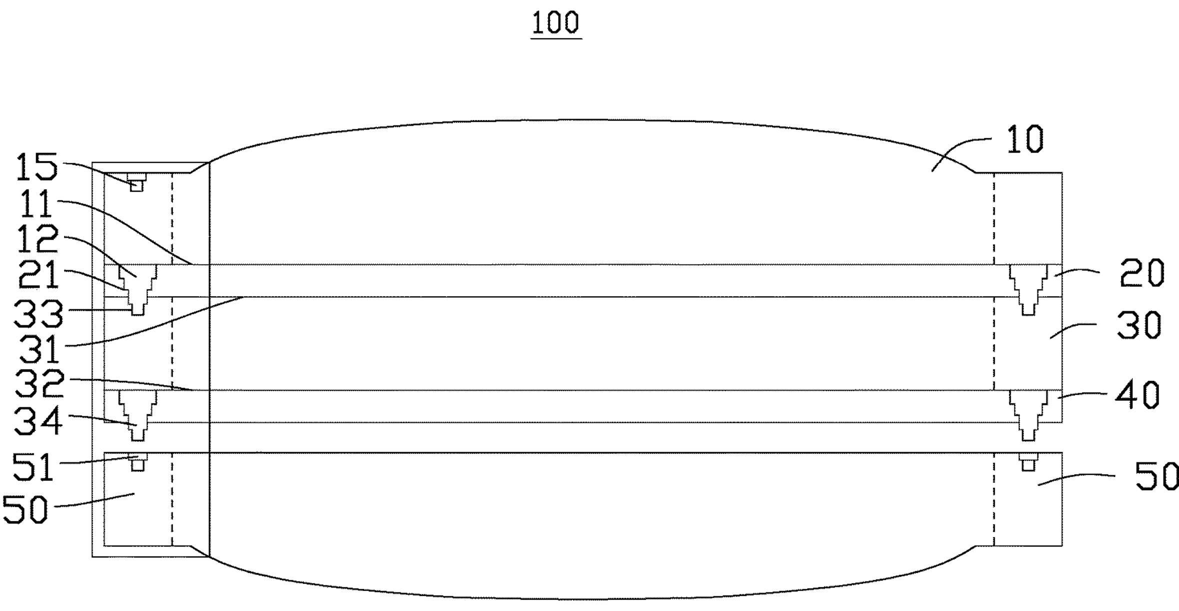
FIG. 1 illustrates a schematic view of a lens assembly according to the present disclosure.

DESCRIPTION OF MAIN COMPONENTS OR ELEMENTS lens assembly 100;
first lens 10;
first surface 11;
first positioning part 12;
a first position portion 121;
a second position portion 122;
first optical part 13;
first connection part 14;
second position groove 15;
first polarizing film 20;
first position hole 21;
first step hole 21*a;*
second lens 30;
second surface 31;
third surface 32;
first position groove 33;
second step hole 33*a;*
second positioning part 34;
a third position portion 341;
a fourth position portion 342;
second optical part 35;

second connection part 36;
second polarizing film 40;
second position hole 41;
third lens 50;
third position groove 51;
first calibration line 61;
first regulating line 62;
second calibration line 63;
second regulating line 64;
first polarizing line 65;
second polarizing line 66;
third polarizing line 67;
fourth polarizing line 68;
first polarizing axis O1;
second polarizing axis O2;
third step hole K;
first line L1;
second line L2;
third line L3;
fourth line LA;
first virtual line L5;
second virtual line L6;
first extension line L7;
first projection line L8;
second extension line L9;
second projection line L10;
first point P1;
second point P2;
third point P3;
fourth point P4.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein comprises any and all combinations of one or more of associated listed items.

Some embodiments of the present application are described in detail. In the case of no conflict, the following embodiments and the features in the embodiments can be combined with each other.

Figure 2:
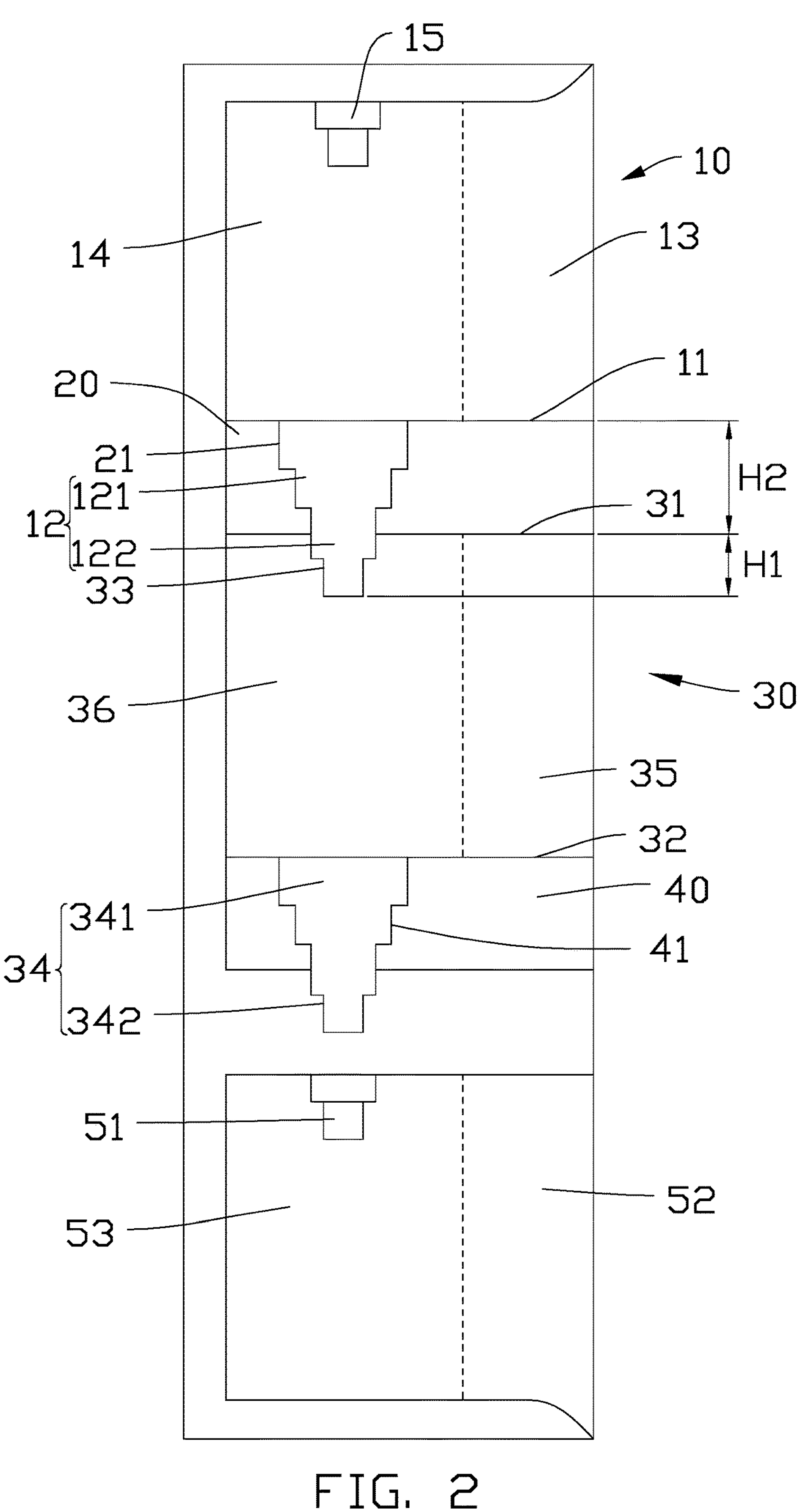
FIG. 2 illustrates an enlarged diagram of the lens assembly shown in FIG. 1.
Figure 3:
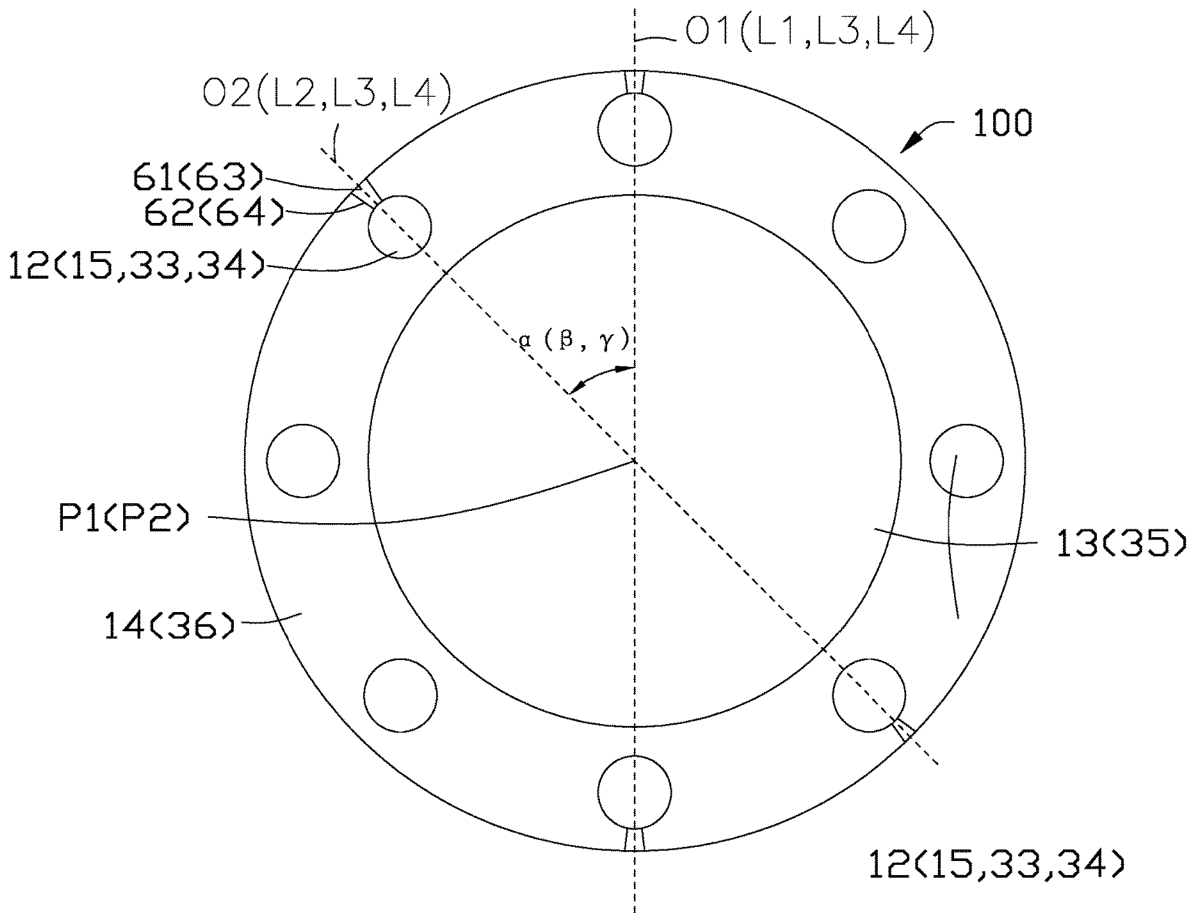
FIG. 3 illustrates a top view of the lens assembly according to the present disclosure.

Referring to FIGS. 1-3, in one embodiment, a lens assembly 100 is provided. The lens assembly 100 includes a first lens 10, a first polarizing film 20, a second lens 30 and a second polarizing film 40. The first lens 10 provides with a first surface 11, the first surface provides with a plurality of first positioning parts 12. The first lens 10 includes a first optical portion 13 and a first connecting portion 14. The first optical portion 13 connects with the first connecting portion 14. Two side surfaces of the first optical portion 13 can be a variety of shapes such as plane or spherical or special-shaped surfaces. The plurality of first positioning parts 12 is on the first connecting portion 14 to ensure a normal use of the first optical portion 13.

The first polarizing film 20 is arranged on the first surface 11, a plurality of first position holes 21 is defined on the first polarizing film 20. The plurality of first position holes 21 corresponds respectively with the plurality of first positioning parts 12, and the plurality of first position holes 21 indicates a position of a first polarizing axis O1 of the first polarizing film 20 on the first lens 10. Position of the first polarizing axis O1 is defined by two of the plurality of first position holes 21 when the processing the first polarizing film 20. During the processing of the first polarizing film 20, two of the plurality of first position holes 21 are spaced apart in the direction of the first polarizing axis O1.

The second lens 30 is arranged on one side of the first polarizing film 20 away from the first lens 10, the second lens 30 provides a second surface 31 and a third surface 32, the second surface 31 is closer to the first surface 11 than the third surface 32, the third surface 32 is further away from the first surface 11 than the second surface 31. The second surface 31 defines a plurality of first position grooves 33, the plurality of first position grooves 33 cooperates respectively with the plurality of first positioning parts 12, and the third surface 32 provides a plurality of second positioning parts 34. The second lens 30 includes a second optical portion 35 and a second connecting portion 36. The second optical portion 35 connects with the second connecting portion 36. Two side surfaces of the second optical portion 35 can be a variety of shapes such as plane or spherical or special-shaped surfaces. The plurality of first position groove 33 and the plurality of second positioning parts 34 is on the second connecting portion 36 to ensure a normal use of the second optical portion 35.

The second polarizing film 40 is arranged on the third surface 32. The second polarizing film 40 defines a plurality of second position holes 41, the plurality of second position holes 41 is corresponds respectively with the plurality of second positioning parts 34, and the plurality of second position holes 41 indicates a position of a second polarizing axis O2 of the second polarizing film 40 at the second lens 30. During the processing of the second polarizing film 40, two of the plurality of second position holes 41 are spaced apart in the direction of the second polarizing axis O2. The plurality of first position grooves 33 corresponds respectively with the plurality of first positioning parts 12, a first line L1 is a projection of the first polarizing axis O1 on the second lens 30, a second line L2 is a projection of the second polarizing axis O2 on the second lens 30, an first angle $\alpha$ between the first line L1 and the second line L2 is equal to a preset phase angle.

During an assembly processing of the lens assembly 100, obtaining linear position information of the first polarizing axis O1 of the first polarizing film 20, the first polarizing film 20 is arranged on the first surface 11 of the first lens 10. The plurality of first positioning parts 12 corresponds respectively with the plurality of first position holes 21. Position information of the first polarizing axis O1 of the first polarizing film 20 on the first lens 10 is determined based on the plurality of first positioning parts 12 and the plurality of first position holes 21. Obtaining linear position information of the second polarizing axis O2 of the second polarizing film 40, the second polarizing film 40 is arranged on the third surface 32 of the second lens 30. The plurality of second positioning parts 34 corresponds respectively with the plurality of second position holes 41. Position information of the second polarizing axis O2 of the second polarizing film 40 on the second lens 30 is determined based on the plurality of second positioning parts 34 and the plurality of second position holes 41. Therefore, after the first lens 10 is arranged on the second lens 30, a direction of the first polarizing axis O1 and a direction of the second polarizing axis O2 can still be accurately determined by the plurality of first positioning parts 12 and the plurality of second positioning parts 34.

Arranging the second lens 30 on a side of the first polarizing film 20 away from the first lens 10, and corresponding each of the plurality of first position grooves 33 with the plurality of first positioning parts 12. Since each of the plurality of first positioning parts 12 corresponds respectively with the plurality of first position holes 21 and the plurality of first position grooves 33, therefore, the plurality of first position grooves 33 can determine a position information of the first polarizing axis O1 on the second surface 31, and the plurality of second positioning parts 34 can determine a position of the second polarizing axis O2 on the third surface 32. Therefore, the first angle $\alpha$ can be adjusted by adjusting position of the plurality of first position grooves 33 and position of the plurality of second positioning parts 34.

According to the preset phase angle, the position information of the first polarizing axis O1 is located on the second surface 31, and the position of the second polarizing axis O2 is located on the third surface 32, the processing of the first lens 10, the first polarizing film 20, the second lens 30 and the second polarizing film 40 is completed without some complex optical detectors or detection environment requirements. Therefore, this reduces machining cost and difficulty for highly accurate machining of the lens assembly 100. Furthermore, a combination of the plurality of first positioning parts 12, the plurality of first position holes 21 and the plurality of first position grooves 33 can achieve an accurate processing of the first lens 10, the first polarizing film 20 and the second lens 30. A combination of the plurality of second positioning parts 34 and the plurality of second position holes 41 can achieve an accurate processing of the second lens and the second polarizing film 40. A processing accuracy of the first lens 10, the first polarizing film 20, the second lens 30 and the second polarizing film 40 is improved.

In some embodiments, referring to FIG. 1, the first surface 11, the second surface 31 and the third surface 32 are flat, two sides of the first polarizing film 20 can accurately be arranged on the first surface 11 and the second surface 31, the second polarizing film 40 can be arranged on the third surface 32. In other embodiments, shape of the first surface 11 is similar to one side of the first polarizing film 20, shape of the third surface 32 is similar to another side of the second polarizing film 40.

Figure 4:
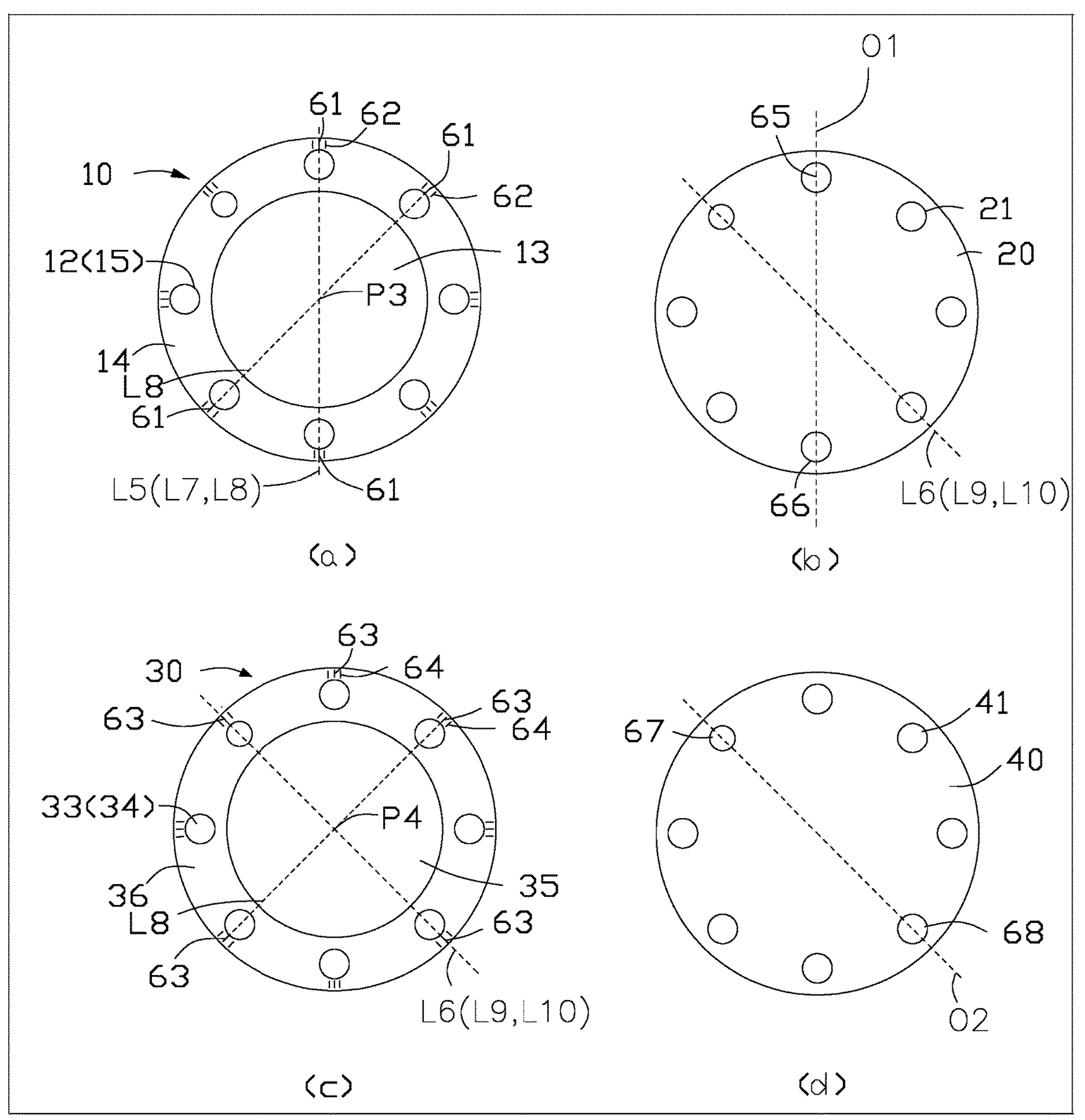
FIG. 4 illustrates schematic view of a first lens, a first polarizing film, a second lens and a second polarizing film of the lens assembly shown in FIG. 1.

Referring to FIG. 4, (a) in FIG. 4 is a schematic view of the first lens 10, (b) in FIG. 4 is a schematic view of the first polarizing film 20, (c) in FIG. 4 is a schematic view of the second lens 30, (d) in FIG. 4 is a schematic view of the second polarizing film 40. The plurality of first positioning parts 12 is distributed at intervals along a circumference of the first lens 10, the plurality of first positioning parts 12 includes multiple first position groups, each of the multiple first position groups includes two adjacent first positioning parts 12, the two adjacent first positioning parts 12 are arranged at intervals. Each of the two adjacent first positioning parts 12 of each of the multiple first position groups defines a third line L3. The third lines L3 of the multiple first position groups intersect at a first point P1.

In one embodiment, one third line of one first position group in the second polarizing film 40 coincides with the second polarizing axis O2, another third lines of another first position groups in the second polarizing film 40 intersects with the second polarizing axis O2, and an angle between any first position group and the second polarizing axis O2 is different. When an angle between the first polarizing axis O1 and the second polarizing axis O2 needs to be adjusted, determining projected positions of the two second positioning parts 34 on the first surface 11, determining an angle between a required third line and the line between the two second positioning parts 34 is equal to a preset phase angle, and determining a required first position group that defined the required third line. During assembly processing of the lens assembly 100, corresponding the two second positioning parts 34 with two first positioning parts 12 of the required first positioning group and two first position holes 21 corresponds respectively with the required first positioning group, therefore, an angle between the first polarization axis O1 and the second polarization axis O2 is equal to the preset phase angle.

In one embodiment, the plurality of first positioning parts 12 is distributed at intervals along a circumference of the first lens 10, this ensures each of the multiple first position groups can correspond with two first position holes 33, and avoid positioning interference problems.

In one embodiment, referring to FIG. 4, the plurality of first positioning parts 12 are evenly spaced apart in a circumferential direction of the first lens 10. Therefore, when the first lens 10 is rotated to any angle, assembly of the first lens 10, the first polarizing film and the second lens 30 can all be achieved.

In one embodiment, the first angle α between two adjacent second lines L3 is between 10° to 60°, such as one of 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°.

In one embodiment, referring to FIG. 4, the plurality of second positioning parts 34 is distributed at intervals along a circumference of the first lens 10, the plurality of second positioning parts 34 includes multiple second position groups, each of the multiple second position groups includes two adjacent second positioning parts 34, the two adjacent second positioning parts 34 are arranged at intervals. Each of the two adjacent second positioning parts 34 of each of the multiple first position groups defines a fourth line L4, The fourth lines L4 of the multiple second position groups intersect at a second point P2.

In one embodiment, a projection of the first point on the first lens 10 coincides with a projection of the second point P2 on the first lens 10.

In one embodiment, fourth line of one second position group in the first polarizing film 20 coincides with the first polarizing axis O1, another fourth lines L4 of another second position groups in the first polarizing film 20 intersects with the first polarizing axis O1, and an angle between any second position groups and the first polarizing axis O1 is different. When the first angle α between the first polarizing axis O1 and the second polarizing axis O2 needs to be adjusted, determining projected positions of the two first positioning parts 12 on the third surface 32, determining an angle between a required fourth line and the line between the two first positioning parts 12 is equal to a preset phase angle, and determining a required second position group that defined the required fourth line. During assembly processing of the lens assembly 100, corresponding two first position grooves 33 that corresponds respectively with the two second positioning parts 34 of the required second position group with two first positioning parts of the first lens 10 and two first position holes 21 of the first polarizing film 20, therefore, an angle between the first polarization axis O1 and the second polarization axis O2 is equal to the preset phase angle.

In one embodiment, the plurality of second positioning parts 34 is distributed at intervals along a circumference of the first lens 10, this ensures each of the multiple second position groups can correspond with two second position holes 41, and avoid positioning interference problems.

In one embodiment, referring to FIG. 4, the plurality of second positioning parts 34 are evenly spaced apart in a circumferential direction of the first lens 10. Therefore, when the first lens 10 is rotated to any angle, assembly of the first lens 10, the first polarizing film 20 and the second lens 30 can all be achieved.

In one embodiment, an second angle β between two adjacent fourth lines L4 is between 10° to 60°, such as one of 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°.

In one embodiment, referring to FIG. 4, number of the first positioning parts 12 is eight, the first angle α is 45°. Number of the second positioning parts 34 is eight, the second angle β is 45°.

In one embodiment, in an assembly processing of the lens assembly 100, positioning the first polarizing axis O1 of the first polarizing film 20, arranging the first polarizing film 20 on the first surface 11 of the first lens 10. Corresponding each of the plurality of the first positioning parts 12 with one of the plurality of the first position holes 12, and recording two appointed first positioning parts 12, a first virtual line L5 between projection of the two appointed first positioning parts 12 on the first polarizing film 20 coincides with the first polarizing axis O1.

Positioning the second polarizing axis O2 of the second polarizing film 40, arranging the second polarizing film 40 on the third surface 32 of the second lens 30. Corresponding each of the plurality of the second positioning parts 34 with one of the plurality of second position holes 41, and recording two appointed second positioning parts 34, a second virtual line L6 between projection of the two appointed second positioning parts 34 on the second polarizing film 40 coincides with the second polarizing axis O2.

Arranging the second lens 30 on one side of the first polarizing film 20 away from the first lens 10. According to the preset phase angle, positions of the two appointed first positioning parts 12 and the two appointed second positioning parts 34 are determined, rotating the second lens 30 relative to the first lens 10, until an angle of a line between the two appointed first positioning parts 12 and a line between the two appointed second positioning parts 34 is equal to the preset phase angle. Corresponding each of the plurality of the first positioning parts 12 with one of the plurality of the first position grooves 33 to finish the assembly processing of the lens assembly 100.

In one embodiment, referring to FIGS. 3 and 4, the first lens 10 provides with a plurality of first calibration lines 61, the plurality of first calibration lines 61 is arranged at intervals along the circumference direction of the first lens 10, first extension lines L7 of each of the plurality of first calibration lines 61 intersects a first projection line L8 of the first polarizing axis O1 on the first lens 10 at a third point P3, first extension lines L7 of two of the plurality of first calibration lines 61 coincide with the first projection line L8 of the first polarizing axis O1 on the first lens 10, the second lens 30 provides with a plurality of second calibration lines 63, the plurality of second calibration lines 63 is arranged at intervals along the circumference direction of the second lens 30, each of extension lines L9 of the plurality of second calibration lines 63 intersects or coincides a second projection line L10 of the second polarizing axis O2 on the second lens 30 at a fourth point P4, an extension lines L9 of two of the plurality of second calibration lines 63 coincides with the second projection line L10 of the second polarizing axis O2 on the second lens 30.

In processing of the first lens 10 and the second lens 30, after the plurality of first positioning parts 12 corresponds respectively with the plurality of the first position grooves 33, calibrating two first calibration lines 61 corresponds respectively with the first polarizing axis O1 and two second calibration lines 63, and coinciding the two first calibration lines 61 and the two second calibration lines 63, therefore, an angle of the first polarizing axis O1 between the second polarizing axis O2 is equal to the preset phase angle, this improves accuracy of phase angle adjustment.

Furthermore, when the preset phase angle is needed to adjust, adjusting corresponding relationship between the two second calibration lines 63 with another first calibration line 61, and the phase angle can be increased or decreased. For example, in FIG. 4, when the second lens 30 is rotates clockwise relative to the first polarizing film 20, the angle between the first polarizing axis O1 and the second polarizing axis O2 is increased, and the phase angle is increased. When the second lens 30 is rotates counterclockwise relative to the first polarizing film 20, the angle between the first polarizing axis O1 and the second polarizing axis O2 is decreased, and the phase angle is decreased. In this way, improve adjustment accuracy of the phase angle, improve efficiency of adjustment of the phase angle.

In one embodiment, referring to FIGS. 3, 4, each of the plurality of the first positioning parts 12 corresponds respectively with a corresponding first calibration line 61 of the plurality of first calibration lines 61, and the corresponding first calibration line 61 coincides with the third line L3 of the first positioning group which is included in the first position parts 12.

In one embodiment, each of the plurality of the second positioning parts 34 corresponds respectively with a corresponding second calibration line 63 of the plurality of second calibration lines 63, and the corresponding second calibration line 63 coincides with the fourth line L4 of the second positioning group which is included in the first position parts 34.

In one embodiment, referring to FIGS. 3, 4, a plurality of first regulating lines 62 is arranged at two sides of each of the plurality of first calibration lines 61. The plurality of first regulating lines 62 is spaced apart at predetermined arcs, and adjustment accuracy and efficiency of the preset phase angle is improved.

In one embodiment, referring to FIGS. 3, 4, a plurality of second regulating lines 64 is arranged at two sides of each of the plurality of second calibration lines 63. The plurality of second regulating lines 64 is spaced apart at predetermined arcs, and adjustment accuracy and efficiency of the preset phase angle is improved.

In one embodiment, referring to FIG. 4, the plurality of first regulating lines 62 is arranged on the first connection part 14, the plurality of second regulating lines 64 is arranged on the second connection part 36.

In one embodiment, referring to FIG. 4, the first polarizing film 20 is provided with a first polarizing line 65 and a second polarizing line 66, the first polarizing line 65 is collinear with the second polarizing line 66, extend line of the first polarizing line 65 and extend line of the second polarizing line 66 are coincident with the first polarizing axis O1. In processing of the first lens 10 and the first polarizing film 20, and after the plurality of first positioning parts 12 corresponds respectively with the first position holes 21, adjusting position of the first polarizing film 20 on the first lens 10, and coinciding the two first calibration lines 61 of the first position group corresponds respectively with the first polarizing line 65 and the second polarizing line 66, therefore, the first position group is capable of defining the first polarizing axis O1 on the first lens 10, and improve assembly precision of the first polarizing film 20 on the first lens 10.

In one embodiment, referring to FIG. 4, the second polarizing film 40 is provided with a third polarizing line 67 and a fourth polarizing line 68, the third polarizing line 67 is collinear with the fourth polarizing line 68, extend line of the third polarizing line 67 and extend line of the fourth polarizing line 68 are coincident with the second polarizing axis O2. In processing of the second lens 30 and the second polarizing film 40, and after the plurality of second positioning parts 34 corresponds respectively with the second position holes 41, adjusting position of the second polarizing film 40 on the second lens 30, and coinciding the two third calibration lines 63 of the second position group corresponds respectively with the second polarizing line 67 and the fourth polarizing line 67, therefore, the second position group is capable of defining the second polarizing axis O2 on the second lens 30, and improve assembly precision of the second polarizing film 40 on the second lens 30.

In one embodiment, referring to FIG. 2, each of the plurality of first positioning parts 12 includes a first position portion 121 and a second position portion 122, the first position portion 121 is arranged on the first surface 11, the second position portion 122 connects with the first position portion 121, the first portion 121 is received in one of the plurality of the first position holes 21, the second position portion 122 is received in one of the plurality of the first position grooves 33. In this way, each plurality of the first positioning part 12 in capable of positioning one of the plurality of first position holes 21 and one of the plurality of first position grooves 33 at the same time.

In one embodiment, referring to FIG. 2, each of the plurality of first position holes 21 is a first step hole 21*a*, each of the plurality of first position grooves 33 is a second step hole 33*a*. Each of the plurality of first step hole 21*a* and each of the plurality of second step hole 33*a* are communicate and cooperatively form a third step hole K, each of the plurality of the first positioning parts 21 cooperates with one third step hole K. Each of the plurality of the first positioning parts 21 is received in one third step hole K, shape of outer perimeter of each of the plurality of the first positioning parts 21 is similar with shape of each of the plurality of the third step holes K. This improves positioning accuracy between each two of the first lens 10, the first polarizing film 20 and the second lens 30.

In one embodiment, each of the plurality of first positioning parts 21 is formed as a cylindricity, each of the plurality of first position holes 21 is formed as a cylindrical bore, and each of the plurality of first position grooves 33 is formed as a cylindrical groove.

In one embodiment, groove depth H1 of each of the plurality of first position grooves 33 is 10% to 50% of thickness of the second lens 30.

In one embodiment, groove depth of each of the plurality of first position grooves 33 is between 500 μm to 5 mm. The groove depth is one of 500 μm, 600 μm, 700 μm, 800 μm, 900 μm, 1 mm, 2 mm, 3 mm, 4 mm, 5 mm.

In one embodiment, hole depth H2 of each of the plurality of first position holes 21 is between 500 μm to 5 mm. The hole depth H2 is one of 500 μm, 600 μm, 700 μm, 800 μm, 900 μm, 1 mm, 2 mm, 3 mm, 4 mm, 5 mm.

In one embodiment, the lens assembly 100 includes a plurality of lenses and a plurality of polarizing films, two of the plurality of polarizing films are provided on two sides of one of the plurality of lenses. In other embodiment, two of the plurality of lenses are provided on two sides of one of the plurality of polarizing films.

In one embodiment, a surface of the first lens 10 away from the second lens 30 defines a second position groove 15, and the second position groove 15 is configured to correspond with another positioning part of another lens.

In one embodiment, the lens assembly 100 further includes a third lens 50, the third lens 50 defines two third position grooves 51, each of the two third position grooves 51 corresponds respectively with one second positioning part 34. The second polarizing film 40 is arranged between the second lens 30 and the third lens 50, the second positioning part 34 extends through the second position hole 41 and corresponds with the third position groove 51.

In one embodiment, referring to FIG. 2, each of the plurality of second positioning parts 34 includes a third position portion 341 and a fourth position portion 342. The third position portion 341 is arranged on the second surface 32. Each of the plurality of fourth positions 342 is connected with one of the plurality of third positions 341, the plurality of third portions 341 is configured to correspond with another position hole of another polarizing film, the plurality of fourth position portions 342 is configured to correspond with another position groove of another lens.

In one embodiment, a draft angle of a mold of processing the first positioning part 12, the first position groove 33 and the second positioning part 34 is between 0.1° to 1°. In this way, outer surface of the first positioning part 12, inner surface of the first position groove 33, and outer surface of the second positioning part 34 are all kept intact, and improve positioning accuracy.

Figure 5:
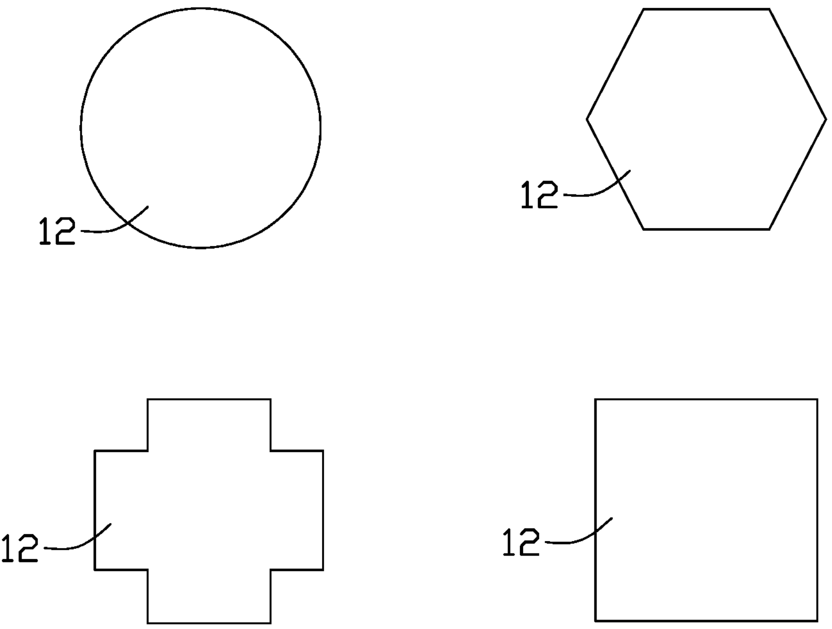
FIG. 5 illustrates cross-sectional views of a first positioning part of the lens assembly in embodiments of the present disclosure.

In one embodiment, referring to FIG. 5, a cross-section of the first positioning part 12 is circular, polygonal, cross-shaped, triangular, etc., the polygon may be quadrilateral, hexagonal, etc.

In one embodiment, shape of the first positioning part 12 is taper, shape of the first position groove 33 is taper, shape of the first position hole 21 is dome.

In one embodiment, shape of the first positioning part 12, shape of the first position groove 33 and shape of the first position hole 21 are all cylindrical.

In one embodiment, shape of the second positioning part 34 is similar to the shape of the first positioning part 12, and shape of the second position hole 41 is similar to the shape of the first position hole 21.

In one embodiment, material of the first lens 10 may be one of high penetration lens material such as glass, PMMA (Polymethyl Methacrylate), sapphire, COC (copolymers of cycloolefin). material of the second lens 30 may be one of high penetration lens material such as glass, PMMA, sapphire, COC.

In one embodiment, material of the first polarizing film 20 may be one of optical material, protective film and organic material film type. Material of the second polarizing film 40 may be one of optical material, protective film, and organic material film type. The second polarizing film 40 may be one of TAC (Tri-cellulose Acetate), PVA (polyvinyl alcohol), PET (polyethylene terephthalate).

This disclosure further provides a processing method of lens assembly 100, the processing method of lens assembly is configured to process the above lens assembly 100, the processing method of lens assembly includes:

Forming a plurality of first position holes 21 at an edge of a first polarizing film, configuring the plurality of first position holes 21 to position a first polarizing axis O1 of the first polarizing film 10. Forming a plurality of first positioning parts 12 at an edge of a first surface 11 of a first lens 10.

Forming a plurality of second position holes 41 at an edge of a second polarizing film 40, configuring the plurality of second position holes 41 to position a second polarizing axis O2 of the second polarizing film 40.

Forming a plurality of first position grooves 33 at an edge of a second surface 31 of a second lens 30, configuring each of the first plurality of position grooves 33 to correspond with one of the plurality of first position holes 21, and positioning a projection of the second polarizing axis O2 on the second surface 31.

Forming a plurality of second positioning parts 34 at an edge of third surface 32 of the second lens 30, each of the plurality of second positioning parts 34 is configured to receive in one of the plurality of second position holes 41, and position projection of the second polarizing axis O2 on the third surface 32.

Adjusting the plurality of second positioning parts 34 to the plurality of first position grooves 33 until an angle between the first polarizing axis O1 and the second polarizing axis O2 is equal to a preset phase angle.

Stacking the first lens 10, the second lens 30 and the first polarizing film 20, and extending each of the plurality of first positioning parts 12 through one of the plurality of first position holes 21 and corresponding with one of the first plurality of position grooves 33.

Arranging the second polarizing film 40 on the third surface 32 of the second lens 30, and corresponding each of the plurality of second positioning parts 34 in one of the plurality of second position holes 41.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens assembly comprising:

a first lens provided with a first surface, a plurality of first positioning parts being provided on the first surface;

a first polarizing film arranged on the first surface, wherein a plurality of first position holes is defined on the first polarizing film, the plurality of first position holes corresponds respectively with the plurality of first positioning parts, and the plurality of first position holes indicates a position of a first polarizing axis of the first polarizing film on the first lens;

a second lens arranged on one side of the first polarizing film away from the first lens, wherein the second lens is provided with a second surface and a third surface, the second surface is closer to the first surface than the third surface, the third surface is further away from the first surface than the second surface, the second surface defines a plurality of first position grooves, the plurality of first position grooves cooperates respectively with the plurality of first positioning parts, and a plurality of second positioning parts is provided on the third surface; and a second polarizing film arranged on the third surface, wherein the second polarizing film defines a plurality of second position holes, the plurality of second position holes corresponds respectively with the plurality of second position parts, and the plurality of second position holes indicates a position of a second polarizing axis of the second polarizing film on the second lens, the plurality of first positioning parts is respectively received in the plurality of first position grooves, a first line is a projection of the first polarizing axis on the second lens, a second line is a projection of the second polarizing axis on the second lens, an angle between the first line and the second line is equal to a preset phase angle.

2. The lens assembly as claimed in claim 1, wherein the plurality of first positioning parts is distributed at intervals along a circumference of the first lens, the plurality of first positioning parts comprises multiple first position groups, each of the multiple first position groups comprises two adjacent first positioning parts, the two adjacent first positioning parts are arranged at intervals, each of the two adjacent first positioning parts of each of the multiple first position groups defines a third line, the third lines of the multiple first position groups intersect at a first point.

3. The lens assembly as claimed in claim 2, wherein the plurality of second positioning parts is distributed at intervals along a circumference of the second lens, the plurality of second positioning parts comprises multiple second position groups, each of the multiple second position groups comprises two adjacent second positioning parts, the two adjacent second positioning parts are arranged at intervals, each of the two adjacent second positioning parts of each of the multiple second position groups defines a fourth line, the fourth lines of the multiple second position groups intersect at a second point.

4. The lens assembly as claimed in claim 3, wherein the first lens is provided with a plurality of first calibration lines, the plurality of first calibration lines is arranged at intervals along the circumference direction of the first lens, the plurality of first calibration lines intersects a projection line of the first polarizing axis on the first lens at a point, extension lines of two of the plurality of first calibration lines coincide with the projection line of the first polarizing axis on the first lens, the second lens is provided with a plurality of second calibration lines, the plurality of second calibration lines is arranged at intervals along a circumference direction of the second lens, the plurality of second calibration lines intersects or coincides a projection line of the second polarizing axis on the second lens at a point, an extension lines of two of the plurality of second calibration lines coincide with the projection line of the second polarizing axis on the second lens.

5. The lens assembly as claimed in claim 4, wherein each of the plurality of the first positioning parts corresponds respectively with a corresponding first calibration line of the plurality of first calibration lines, and the corresponding first calibration line coincides with the third line of the first positioning group which is included in the first position parts.

6. The lens assembly as claimed in claim 5, wherein the first lens comprises a first optical portion and a first connecting portion, the first connecting portion is connected to the first optical portion, the plurality of first positioning parts is on the first connecting portion.

7. The lens assembly as claimed in claim 5, wherein the first lens further comprises a plurality of first regulating lines, the plurality of first regulating lines is arranged in two sides of each of the plurality of first calibration lines.

8. The lens assembly as claimed in claim 4, wherein each of the plurality of the second positioning parts corresponds respectively with a corresponding second calibration line of the plurality of second calibration lines, and the corresponding second calibration line coincides with the fourth line of the second position group which is included the second positioning parts.

9. The lens assembly as claimed in claim 8, wherein the second lens comprises a second optical portion and a second connecting portion, the second connecting portion is connected to the second optical portion, the plurality of second calibration lines is on the second connecting portion.

10. The lens assembly as claimed in claim 8, wherein the second lens further comprises a plurality of second regulating lines, the plurality of second regulating lines is arranged in two sides of each of the plurality of second calibration lines.

11. The lens assembly as claimed in claim 4, wherein the first polarizing film is provided with a first polarizing line and a second polarizing line, the first polarizing line is collinear with the second polarizing line, extend line of the first polarizing line and extend line of the second polarizing line are coincident with the first polarizing axis.

12. The lens assembly as claimed in claim 4, wherein the second polarizing film is provided with a third polarizing line and a fourth polarizing line, the third polarizing line is collinear with the fourth polarizing line, extend line of the third polarizing line and extend line of the fourth polarizing line are coincident with the second polarizing axis.

13. The lens assembly as claimed in claim 1, wherein each of the plurality of first positioning parts comprises a first position portion and a second position portion, the first position portion is arranged on the first surface, the second position portion connects with the first position portion, the first portion is received in one of the plurality of the first position holes, the second position portion is received in one of the plurality of the first position grooves.

14. The lens assembly as claimed in claim 13, wherein the first position hole is a first step hole, the first position groove is a second step hole, the first step hole and the second step hole communicate and cooperatively form a third step hole, one of the plurality of the first positioning parts cooperates with the third step hole.

15. The lens assembly as claimed in claim 1, wherein each of the plurality of second positioning parts comprises a third position portion and a fourth position portion, the third position portion is arranged on the second surface, each of the plurality of fourth positions connects with one of the plurality of third positions, the plurality of third portions is configured to correspond with another position hole of another polarizing film, the plurality of fourth position portions is configured to correspond with another position groove of another lens.

16. The lens assembly as claimed in claim 15, wherein the first position hole is a first step hole, the first position groove is a second step hole, the first step hole and the second step hole communicate and cooperatively form a third step hole, one of the plurality of the first positioning parts cooperates with the third step hole.

17. The lens assembly as claimed in claim 1, wherein a groove depth of the first position groove is 10% to 50% of a thickness of the second lens.

18. A processing method of a lens assembly, the processing method comprising:

forming a first position hole at an edge of a first polarizing film, configuring the first position hole to position a first polarizing axis of the first polarizing film;

forming a first positioning part at an edge of a first surface of a first lens;

forming a second position hole at an edge of a second polarizing film, configuring the second position hole to position a second polarizing axis of the second polarizing film;

forming a first position groove at an edge of a second surface of a second lens, configuring the first position groove to correspond with the first position hole, and positioning a projection of the second polarizing axis on the second surface;

forming a second positioning part at an edge of third surface of the second lens, configuring the second positioning part to receive in the second position hole, and positioning a projection of the second polarizing axis on the third surface;

adjusting the second positioning part to the first position groove until an angle between the first polarizing axis and the second polarizing axis is equal to a preset phase angle;

stacking the first lens, the second lens and the first polarizing film, and extending the first positioning part through the first position hole and corresponding with the first position groove;

arranging the second polarizing film on the third surface of the second lens, and corresponding the second positioning part in the second position hole.

* * * * *